US007142872B2

(12) United States Patent
Park et al.

(10) Patent No.: US 7,142,872 B2
(45) Date of Patent: Nov. 28, 2006

(54) SYSTEM AND METHOD FOR PROVIDING POSITION INFORMATION OF MOBILE COMMUNICATION TERMINAL

(75) Inventors: Young-Ki Park, Suwon-shi (KR); Seok-Hun Lim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 189 days.

(21) Appl. No.: 10/733,126

(22) Filed: Dec. 11, 2003

(65) Prior Publication Data

US 2004/0121784 A1    Jun. 24, 2004

(30) Foreign Application Priority Data

Dec. 18, 2002    (KR) .................. P10-2002-0081146

(51) Int. Cl.
*H04Q 7/20*      (2006.01)
*G08B 1/08*      (2006.01)
*G01S 5/00*      (2006.01)
*G01S 5/14*      (2006.01)

(52) U.S. Cl. .............................. 455/456.1; 455/456.2; 455/457; 340/539.13; 340/539.15; 342/357.07; 342/357.08

(58) Field of Classification Search ............. 455/456.1, 455/456.2, 457; 342/357.08, 357.15, 357.09; 340/992, 998, 993, 573.1, 573.3, 573.4, 539.13, 340/539.15

See application file for complete search history.

(56) References Cited

U.S. PATENT DOCUMENTS

| | | | | |
|---|---|---|---|---|
| 5,781,150 | A * | 7/1998 | Norris .................... | 342/357.08 |
| 6,397,074 | B1 * | 5/2002 | Pihl et al. ................. | 455/456.2 |
| 6,456,854 | B1 * | 9/2002 | Chern et al. ................ | 455/457 |
| 6,838,998 | B1 * | 1/2005 | Brown et al. .......... | 340/825.49 |
| 6,850,188 | B1 * | 2/2005 | Lee et al. ............... | 342/357.08 |
| 2002/0086683 | A1 * | 7/2002 | Kohar et al. ................. | 455/456 |
| 2002/0133290 | A1 * | 9/2002 | Nozaki ........................ | 701/208 |
| 2003/0008671 | A1 * | 1/2003 | Lundgren et al. ........... | 455/456 |
| 2003/0013461 | A1 * | 1/2003 | Mizune et al. ............... | 455/456 |
| 2003/0100294 | A1 * | 5/2003 | Hosono ....................... | 455/414 |
| 2003/0119529 | A1 * | 6/2003 | Hirokawa .................... | 455/456 |
| 2004/0072576 | A1 * | 4/2004 | Nuutinen et al. ......... | 455/456.1 |

(Continued)

FOREIGN PATENT DOCUMENTS

EP        1243941 A1 *    9/2002

(Continued)

OTHER PUBLICATIONS

Electronic Translation for JP2003-009203.*

(Continued)

*Primary Examiner*—Lester G. Kincaid
*Assistant Examiner*—Marisol Figueroa
(74) *Attorney, Agent, or Firm*—Dilworth & Barrese LLP

(57) ABSTRACT

A system for providing position information of a target mobile communication terminal whose position is to be found out. The system comprises a first mobile communication terminal and a second mobile communication terminal. The system further comprises a mobile communication server for generating AASA information using radio waves, transmitting the generated AASA information to the first mobile communication terminal and second mobile communication terminal upon receiving a position tracking signal transmitted from the first mobile communication terminal, and transferring second individual position information transmitted from the second mobile communication terminal to the first mobile communication terminal. The first mobile communication terminal calculates correlative position information between it and the second mobile communication terminal on the basis of the first individual position information and second individual position information at intervals of a predetermined time and outputs the calculated correlative position information to a screen.

32 Claims, 8 Drawing Sheets

U.S. PATENT DOCUMENTS

2004/0160359 A1* 8/2004 Kanerva ................ 342/357.08

FOREIGN PATENT DOCUMENTS

JP      2003009203 A * 1/2003

OTHER PUBLICATIONS

Jay Farrell & Matthew Barth, "Global Positioning Sytem & Inertial Navigation", Published by McGraw-Hill, pp. 25-29.

* cited by examiner

SYSTEM AND METHOD FOR PROVIDING POSITION INFORMATION OF MOBILE COMMUNICATION TERMINAL

PRIORITY

This application claims priority to an application entitled "SYSTEM AND METHOD FOR PROVIDING POSITION INFORMATION OF MOBILE COMMUNICATION TERMINAL", filed in the Korean Industrial Property Office on Dec. 18, 2002 and assigned Serial No. 2002-81146, the contents of which are hereby incorporated by reference herein.

BACKGROUND OF THE INVENTION

1. Field of the Invention

The present invention relates generally to a mobile communication terminal, and more particularly to a system and method for providing information regarding a position where a mobile communication terminal is located.

2. Description of the Related Art

Recently, with the increasing complexity of society, the number of missing children and the degree of social concern thereabout has increased. As a result, many institutional policies have been implemented to prevent children from going missing, but the results have been considered to be inadequate. Of course, many devices for prevention of missing children have been developed and there is widespread concern focused on the prevention of missing children. In this connection, it is the current reality that some parents advise their children to carry mobile communication terminals while in transit, in order to prevent their children from going missing. Such mobile communication terminals may provide only a simple telephone function as in general mobile communication terminals.

In order for parents to determine the positions of their children using mobile communication terminals, a technique has been employed which estimates a certain range where each mobile communication terminal is located, on the basis of information regarding a network, or a base station to which each terminal is communicating with (also referred to as "connected"). As a result, a conventional position information provision system using a mobile communication terminal has a disadvantage in that it cannot provide information regarding a precise position of a child carrying the mobile communication terminal because it can estimate only a rough position of the child.

In addition, a conventional system for providing position information of a mobile communication terminal has a disadvantage in that, if the mobile communication terminal is powered off, then a function of tracking the position of the terminal fails, so the terminal position cannot be tracked. If a mobile communication terminal carried by a child is powered off in a given situation, the child's parents will be unable not only to conduct a telephone conversation with him/her, but also to track his/her position, resulting in an increase in the probability for the child to be lost.

SUMMARY OF THE INVENTION

Therefore, the present invention has been designed in view of the above problems, and it is an object of the present invention to provide a position information provision system and method using a mobile communication terminal, which can more accurately provide information regarding the position of a child carrying the mobile communication terminal.

It is another object of the present invention to provide a system and method for providing position information of a mobile communication terminal, which can provide information regarding the last position of a child carrying the mobile communication terminal before the terminal is powered off.

In accordance with one aspect of the present invention, the above and other objects can be accomplished by the provision of a system for providing position information of a target mobile communication terminal whose position is to be determined, comprising a first mobile communication terminal for transmitting a position tracking signal for determining the position of the target mobile communication terminal, and calculating and transmitting first individual position information on the basis of acquisition assistance sensitive assistance (AASA) information at intervals of a predetermined time, the AASA information including a received signal strength indicator of radio waves transmitted from a GPS (Global Positioning System) satellite; a second mobile communication terminal being the target mobile communication terminal, the second mobile communication terminal calculating and transmitting second individual position information on the basis of the AASA information at intervals of a predetermined time; and a mobile communication server for generating the AASA information using the radio waves, transmitting the generated AASA information to the first mobile communication terminal and second mobile communication terminal upon receiving the position tracking signal transmitted from the first mobile communication terminal, and transferring the second individual position information transmitted from the second mobile communication terminal to the first mobile communication terminal. The first mobile communication terminal is adapted to calculate correlative position information between it and the second mobile communication terminal on the basis of the first individual position information and second individual position information at intervals of a predetermined time and output the calculated correlative position information to a screen.

Preferably, the first mobile communication terminal may mark the first individual position information, second individual position information and correlative position information on a map, output the resulting map to the screen and, whenever any of the first individual position information, second individual position information and correlative position information are changed, update the existing information marked on the map with the changed information and mark the updated information on the map. Further, the first mobile communication terminal may, whenever the first individual position information and second individual information are calculated, update moving paths of the first mobile communication terminal and second mobile communication terminal on the basis of the calculated first individual position information and second individual information and mark the updated moving paths on the map.

Preferably, each of the first and second individual position information may include latitude information, longitude information and altitude information of a corresponding one of the first and second mobile communication terminals. Further, the correlative position information may include information regarding a direction and distance from the first mobile communication terminal to the second mobile communication terminal.

In accordance with another aspect of the present invention, there is provided a method for providing position information of a target mobile communication terminal whose position is to be determined, using a communication system, the communication system including a mobile communication server, a mobile communication network and first and second mobile communication terminals connected to the mobile communication server over the mobile communication network, the second mobile communication terminal being the target mobile communication terminal, the method comprising the steps of a) transmitting a position tracking signal for determining the position of the second mobile communication terminal to the mobile communication server, the server generating AASA information for position information calculation on the basis of radio waves transmitted from a GPS satellite; b) calculating first individual position information of the first mobile communication terminal on the basis of the AASA information transmitted from the mobile communication server in response to the position tracking signal received thereby; c) calculating second individual position information of the second mobile communication terminal on the basis of the AASA information transmitted from the mobile communication server in response to the position tracking signal received thereby, transferring the calculated second individual position information to the first mobile communication terminal through the mobile communication server and determining whether the second individual position information has been received by the first mobile communication terminal; d) calculating correlative position information between the first mobile communication terminal and the second mobile communication terminal on the basis of the first individual position information and second individual position information if the second individual position information is determined to have been received; and e) outputting the calculated correlative position information to a screen.

Preferably, the correlative position information may include the first individual position information and the second individual position information, and the step e) may include the step e-1) of outputting the correlative position information including the first individual position information and the second individual position information to the screen. The step e) may further include the step e-2) of marking the correlative position information on a map and outputting the map marked with the correlative position information to the screen. Each of the first and second individual position information may include latitude information, longitude information and altitude information of a corresponding one of the first and second mobile communication terminals. Further, the correlative position information may include information regarding a direction and distance from the first mobile communication terminal to the second mobile communication terminal.

In accordance with a further aspect of the present invention, there is provided a system for providing position information of a target mobile communication terminal whose position is to be determined, comprising a first mobile communication terminal for transmitting a position tracking signal for determining the position of the target mobile communication terminal, and calculating and transmitting first individual position information on the basis of AASA information at intervals of a predetermined time, the AASA information including a received signal strength indicator of radio waves transmitted from a GPS satellite; a second mobile communication terminal being the target mobile communication terminal, the second mobile communication terminal calculating and transmitting second individual position information on the basis of the AASA information at intervals of a predetermined time; and a mobile communication server for generating the AASA information using the radio waves, transmitting the generated AASA information to the first mobile communication terminal and second mobile communication terminal upon receiving the position tracking signal, calculating correlative position information between the first mobile communication terminal and the second mobile communication terminal on the basis of the first individual position information and second individual position information whenever the first and second individual position information are received and transmitting the calculated correlative position information to the first mobile communication terminal. The first mobile communication terminal is adapted to update the correlative position information whenever the correlative position information is received and output the updated correlative position information to a screen.

Preferably, the mobile communication server may mark the first individual position information, second individual position information and correlative position information on a map, transmit the resulting map to the first mobile communication terminal and, whenever any of the first individual position information, second individual position information and correlative position information are changed, update the existing information marked on the map with the changed information, mark the updated information on the map and transmit the resulting map to the first mobile communication terminal. Further, the mobile communication server may, whenever the first individual position information and second individual information are received, update moving paths of the first mobile communication terminal and second mobile communication terminal on the basis of the received first individual position information and second individual information, mark the updated moving paths on the map and transmit the map marked with the updated moving paths to the first mobile communication terminal.

In accordance with a further aspect of the present invention, there is provided a method for providing position information of a target mobile communication terminal whose position is to be determined, using a communication system, the communication system including a mobile communication server, a mobile communication network and first and second mobile communication terminals connected to the mobile communication server over the mobile communication network, the second mobile communication terminal being the target mobile communication terminal, the method comprising the steps of a) transmitting a position tracking signal for determining the position of the second mobile communication terminal to the mobile communication server, the server generating AASA information for position information calculation on the basis of radio waves transmitted from a GPS satellite; b) calculating first individual position information of the first mobile communication terminal and second individual position information of the second mobile communication terminal on the basis of the AASA information transmitted to the first mobile communication terminal and second mobile communication terminal by the mobile communication server in response to the position tracking signal received thereby and transmitting the calculated first and second individual position information to the mobile communication server; c) calculating and transmitting correlative position information between the first mobile communication terminal and the second mobile communication terminal on the basis of the first individual position information and second individual position information by the mobile communication server and receiving the transmitted correlative position information by the first mobile communication terminal; and d) outputting the received correlative position information to a screen.

Preferably, the step d) may include the step d-1) of marking the correlative position information on a map along with the first individual position information and second individual position information and outputting the resulting map to the screen. The step d) may further include the step d-2) of updating the correlative position information outputted to the screen whenever it is received, outputting the updated correlative position information to the screen, marking moving paths of the first mobile communication terminal and second mobile communication terminal on the map on the basis of the first individual position information and second individual position information and outputting the resulting map to the screen.

In accordance with a further aspect of the present invention, there is provided a system for providing position information of a target mobile communication terminal whose position is to be determined, comprising a communication terminal for transmitting a position tracking signal for determining the position of the target mobile communication terminal; a first mobile communication terminal for calculating and transmitting first individual position information on the basis of AASA information at intervals of a predetermined time, the AASA information including a received signal strength indicator of radio waves transmitted from a GPS satellite; a second mobile communication terminal being the target mobile communication terminal, the second mobile communication terminal calculating and transmitting second individual position information on the basis of the AASA information at intervals of a predetermined time; a mobile communication server responsive to the position tracking signal for generating the AASA information using the radio waves and transmitting the generated AASA information to the first mobile communication terminal and second mobile communication terminal, the mobile communication server receiving and transferring the first individual position information and second individual position information transmitted respectively from the first mobile communication terminal and second mobile communication terminal; and a Web server connected with the communication terminal over a network and with the mobile communication server over a mobile communication network, the Web server calculating correlative position information between the first mobile communication terminal and the second mobile communication terminal on the basis of the first individual position information and second individual position information at intervals of a predetermined time and transmitting the calculated correlative position information to the communication terminal. The communication terminal is adapted to receive the transmitted correlative position information and output it to a screen.

Preferably, the Web server may mark the correlative position information including the first individual position information and second individual position information on a map and provide the resulting map to the communication terminal. As a result, the communication terminal may receive the map and output it to the screen.

In accordance with another aspect of the present invention, there is provided a method for providing position information of a target mobile communication terminal whose position is to be determined, using a communication system, the communication system including a communication terminal, a Web server connected with the communication terminal over a network, a mobile communication server connected with the Web server over a mobile communication network, the mobile communication server generating AASA information for position information calculation using radio waves transmitted from a GPS satellite, and first and second mobile communication terminals connected to the mobile communication network, the second mobile communication terminal being the target mobile communication terminal, the method comprising the steps of a) transmitting a position tracking signal for determining the position of the second mobile communication terminal to the mobile communication server via the Web server; b) calculating first individual position information of the first mobile communication terminal and second individual position information of the second mobile communication terminal on the basis of the AASA information transmitted to the first mobile communication terminal and second mobile communication terminal by the mobile communication server in response to the position tracking signal received thereby, calculating correlative position information between the first mobile communication terminal and the second mobile communication terminal on the basis of the calculated first individual position information and second individual position information by the Web server and determining whether the calculated correlative position information has been received; and c), if the correlative position information is determined to have been received, updating the received correlative position information at intervals of a predetermined time and outputting the updated correlative position information to a screen.

Preferably, the step c) may include the step of marking moving paths of the first mobile communication terminal and second mobile communication terminal on a map on the basis of the first individual position information and second individual position information and outputting the resulting map to the screen.

In accordance with yet another aspect of the present invention, there is provided a method for providing position information of a mobile communication terminal having a GPS function, comprising the steps of a) determining whether the mobile communication terminal will be powered off after the lapse of a predetermined period of time in a power-on state; b) if it is determined that the mobile communication terminal will be powered off, requesting a mobile communication server to transmit AASA information for position information calculation, the mobile communication server generating the AASA information on the basis of radio waves transmitted from a GPS satellite; c) if the AASA information is received, calculating individual position information of the mobile communication terminal on the basis of the received AASA information; and d) transmitting the calculated individual position information to a different mobile communication terminal linked to the mobile communication terminal through the mobile communication server.

Preferably, the method may further comprise the step of generating a short message service (SMS) message including the individual position information after the step c) is performed. As a result, the step d) may include the step of transmitting the SMS message to the different mobile communication terminal.

In a feature of the present invention, position information of a target mobile communication terminal can be more accurately provided by calculating it using radio waves transmitted from a GPS satellite. Further, inter-terminal correlative position information can be calculated and provided on the basis of individual position information of respective mobile communication terminals acquired using the GPS satellite. Therefore, the position of the target mobile communication terminal can be more easily acquired. In addition, a moving path of the target mobile communication terminal can be tracked and displayed on a screen, thereby enabling the terminal position to be more easily found out.

However, if the target mobile communication terminal enters a power-off mode, then it can calculate its position information using the GPS satellite and transmit the calculated position information to another mobile communication terminal linked thereto in the form of an SMS message, before being powered off. Therefore, even though the target mobile communication terminal is powered off, its position can be more easily estimated. Furthermore, the position of the target mobile communication terminal can be more accurately acquired over the Web by requesting position information of the mobile communication terminal on the Web, calculating inter-terminal correlative position information using the GPS satellite and marking the calculated information on a map.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
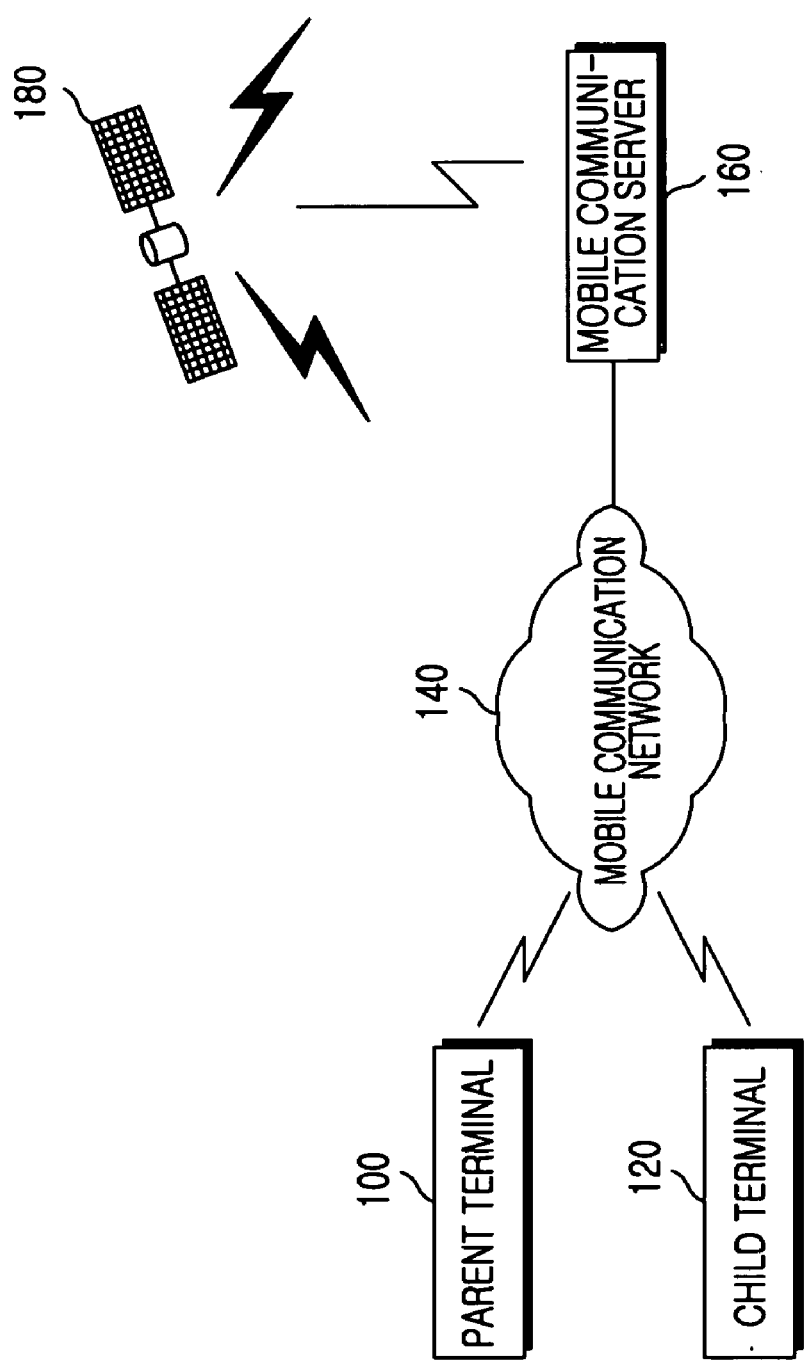
FIG. 1 is a block diagram showing a first embodiment of a system for providing position information of a mobile communication terminal in accordance with the present invention.

Preferred embodiments of the present invention will be described in detail herein below with reference to the annexed drawings. In the drawings, the same or similar elements are denoted by the same reference numerals even though they are depicted in different drawings. In the following description made in conjunction with preferred embodiments of the present invention, a variety of specific elements as constituting elements of various specific circuits are shown. The description of such elements has been made only for a better understanding of the present invention. Those skilled in the art will appreciate that the present invention can be implemented by using alternatives to the above-mentioned specific elements. In the following description of the present invention, a detailed description of known functions and configurations incorporated herein will be omitted to focus on the subject matter of the present invention.

With reference to FIG. 1, there is shown in block form a first embodiment of a system for providing position information of a mobile communication terminal in accordance with the present invention. As shown in this drawing, the terminal position information provision system comprises a parent terminal 100, a child terminal 120, a mobile communication network 140, a mobile communication server 160 and a GPS (Global Positioning System) satellite 180. Here, although the parent terminal 100 and the child terminal 120 are mobile communication terminals having the same functions, they are called different names in terms of the associated users in the present embodiment. In this embodiment, the parent terminal 100 is a mobile communication terminal with a telephone function, held by a parent, and the child terminal 120 is a mobile communication terminal with a telephone function, held by the child.

The mobile communication network 140 is a communication network for setting up wireless communication channels between the parent terminal 100 and child terminal 120 and the mobile communication server 160. The mobile communication server 160 is adapted to communicate with the parent terminal 100 and child terminal 120 connected thereto over the mobile communication network 140, and control the operations of the terminals 100 and 200 as needed. The GPS satellite 180 orbits the earth at fixed periods while being spaced apart from the earth by a predetermined distance. The satellite 180 transmits radio waves necessary for calculation of position information to the earth.

A detailed description will hereinafter be given of the operation of the first embodiment of the terminal position information provision system with the above-stated construction in accordance with the present invention. The parent terminal 100 transmits a child position tracking signal to the mobile communication server 160 over the mobile communication network 140 in response to an input signal by the parent user to find out the position of the child terminal 120.

The mobile communication server 160 receives the radio waves transmitted from the GPS satellite 180 and generates acquisition assistance sensitive assistance (AASA) information using the received radio waves, which information is information regarding the status of the GPS satellite 180 and a received signal strength indicator of the radio waves transmitted from the GPS satellite 180. The mobile communication server 160 has registered ID information of the parent terminal 100 and child terminal 120, such as telephone numbers thereof. Upon receiving ID information associated signals from the parent terminal 100 and child terminal 120, the mobile communication server 160 determines on the basis of the registered ID information whether the terminals were previously registered.

Upon receiving the child position tracking signal transmitted from the parent terminal 100, the mobile communication server 160 transmits the AASA information generated using the radio waves from the GPS satellite 180 to the parent terminal 100 and child terminal 120 over the mobile communication network 140.

The parent terminal 100 calculates its individual position information on the basis of the AASA information transmitted from the mobile communication server 160. More specifically, a mobile terminal is requested by a server (PDE), to transmit terminal information (e.g., ESN, telephone number, etc.) and pilot phase measurements. The mobile terminal transmits the above-required information and measurements to the server. Next, the server (PDE) transmits GPS AA (Acquisition Assistance), which is satellite signal information having a strong strength, received by a mobile terminal, adjacent to the position in which the mobile terminal is located. The mobile terminal searches for pseudoranges delivered by the satellite using the information and obtains a phase therefor. The mobile terminal requests the server to transmit GPS SA (Sensitivity Assistance) information, which is satellite signal information having weak strength, received by the mobile terminal. Accordingly, the server transmits GPS SA information adjacent to the mobile terminal. The mobile terminal searches for the pseudoranges delivered by the satellite using the GPS SA information and obtains the phrase, and then transmits the calculated information for the GPS pseudoranges, pilot phase measurements and MS time offset means, and requests the server to send the exactly calculated position information. From this information, the server calculates the exact position of the mobile terminal and transmits the three kinds of information, i.e., latitude, longitude and altitude to the mobile station. Finally, the mobile terminal determines its own position.

Herein, please note that the server is referred to as a PDE and is a server for specially calculating the position. The position information calculating method as described above is currently used in the mobile terminals. That is, it is a terminal reliance method. However, in case of self-reliance method, the mobile terminal will calculate the position by itself, which will be provided in the future.

The individual position information calculated by the parent terminal 100 is information regarding the position of the parent terminal 100, which includes latitude, longitude, and altitude information on a map regarding the position of the terminal 100. The child terminal 120 calculates its individual position information regarding the position thereof on the basis of the AASA information transmitted from the mobile communication server 160. Then, the child terminal 120 transmits the calculated individual position information to the mobile communication server 160 over the mobile communication network 140. The mobile communication server 160 receives the individual position information transmitted from the child terminal 120 and transfers it to the parent terminal 100 over the mobile communication network 140.

The parent terminal 100 calculates correlative position information indicative of a position of the child terminal 120 with respect to the parent terminal 100 using the calculated individual position information of the terminal 100 and the individual position information of the child terminal 120 transferred from the mobile communication server 160. Preferably, the parent terminal 100 calculates the correlative position information regarding the position of the child terminal 120 relative to its position. At this time, the correlative position information includes information regarding a direction and distance from the parent terminal 100 to the child terminal 120.

In the present embodiment, the distance information of the correlative position information is calculated through an ECEF (Earth-Centered-Earth-Fixed) conversion method, which is well known in the art. The ECEF conversion method is disclosed in detail in an article entitled "Global Positioning System & Inertial Navigation" by "Jay A. Farrell and Matthew Barth" (Release Date: 31 Dec. 1998, Publisher: McGraw-Hill Professional), pages 25 to 29. Thus, a detailed description of this method will be omitted in the present embodiment. For calculation of the direction information of the correlative position information, the direction is first defined on the basis of north, south, east, and west. A reference azimuth is selected between the distance from the parent terminal 100 to the child terminal 120, calculated by the ECEF conversion method, and the position of the parent terminal 100. An included angle is calculated on the basis of a distance from the coordinates of the child terminal 120 to a point on the selected reference azimuth to which the terminal 120 is perpendicularly connected. Then, one range among the quadrant of the coordinate system of the parent terminal 100 where the child terminal 120 is located is divided into four or more equal parts. The direction of any one of the divided ranges including the position of the child terminal 120 is acquired as the direction information of the child terminal 120.

The parent terminal 100 displays and outputs the calculated correlative position information through an LCD (not shown) and/or speaker (not shown) therein. Accordingly, the position of the child terminal 120 can be more accurately acquired through the use of the parent terminal 100.

Alternatively, the parent terminal 100 may transmit its individual position information calculated on the basis of the AASA information to the mobile communication server 160 over the mobile communication network 140. In this case, the mobile communication server 160 calculates the correlative position information between the parent terminal 100 and the child terminal 120 based on the position of the parent terminal 100 on the basis of the respective individual position information of the terminals 100 and 120. The server 160 then transmits the calculated correlative position information to the parent terminal 100 over the mobile communication network 140. The parent terminal 100 displays the correlative position information transmitted from the mobile communication server 160 on the LCD in character form or outputs it through the speaker in voice form. For example, the correlative position information displayed on the LCD may be "The child terminal 120 is 10 Km away from the parent terminal 100 to the north-northwest thereof.".

Therefore, the position information of a mobile communication terminal can be more accurately provided by calculating it using the radio waves transmitted from the GPS satellite 180.

In addition, in a process where a mobile communication terminal, for example, the parent terminal 100 or child terminal 120 is powered off, the terminal first calculates its individual position information and transmits the calculated individual position information to another mobile communication terminal linked thereto in the form of a short message service (SMS) message, before being powered off. Thus, in the present embodiment, if the child terminal 120 enters a power-off mode, then it requests the mobile communication server 160 over the mobile communication network 140 to transmit the AASA information for calculation of its individual position information, before being powered off. Upon receiving an AASA information transmission request signal transmitted from the child terminal 120, the mobile communication server 160 transmits the AASA information to the child terminal 120 over the mobile communication network 140 so that the child terminal 120 can calculate its individual position information on the basis of the AASA information.

Accordingly, the child terminal 120 calculates its individual position information on the basis of the AASA information transmitted from the mobile communication server 160 and transmits an SMS message including the calculated individual position information to the mobile communication server 160 over the mobile communication network 140. The mobile communication server 160 transfers the SMS message including the individual position information transmitted from the child terminal 120 to the parent terminal 100 over the mobile communication network 140. If the parent terminal 100 receives the SMS message including the individual position information transferred from the mobile communication server 160, then it requests the server 160 to transmit the AASA information for calculation of its individual position information, and calculates its individual position information on the basis of the AASA information transmitted from the server 160. Thereafter, the parent terminal 100 calculates the correlative position information on the basis of the calculated individual position information thereof and the received individual position information of the child terminal 120. The parent terminal 100 then displays the calculated correlative position information on the LCD or outputs it through the speaker. For example, the correlative position information based on the SMS message including the individual position information, displayed on the LCD of the parent terminal 100, may be "The child terminal 120 is powered off. It is 10 Km away from the parent terminal 100 to the north-northwest thereof.". That is, character information including the correlative position information may be displayed on the LCD.

Figure 2:
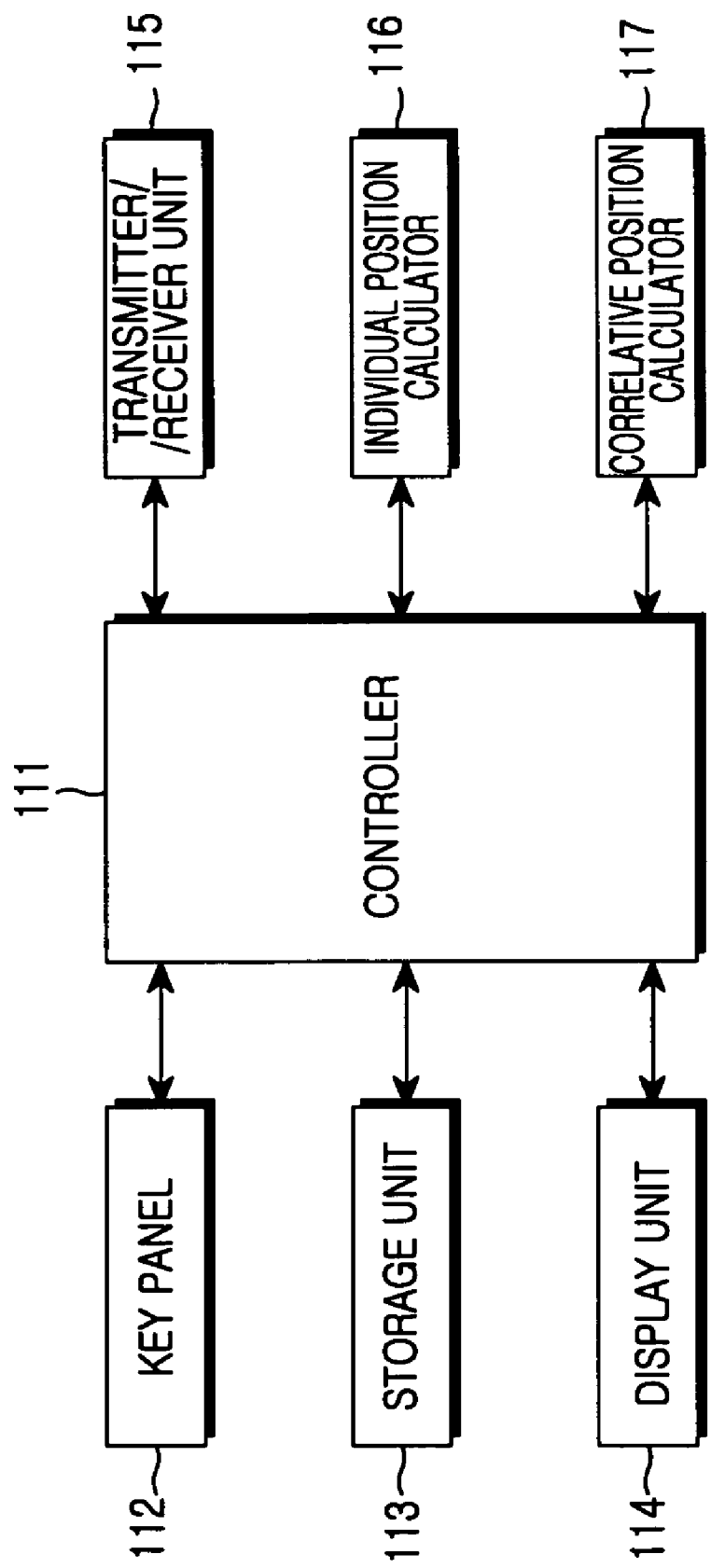
FIG. 2 is a block diagram showing in detail each construction of a parent terminal and child terminal in FIG. 1, which are mobile communication terminals.

FIG. 2 is a block diagram showing in detail each construction of the parent terminal 100 and child terminal 120 in FIG. 1, which are mobile communication terminals. Each mobile communication terminal includes a controller 111, a key panel 112, a storage unit 113, a display unit 114, a transmitter/receiver unit 115, an individual position calculator 116 and a correlative position calculator 117.

The controller 111 controls the entire operation of the corresponding mobile communication terminal. The key panel 112 has a plurality of numeral keys, character keys and function keys. According to the present embodiment, provided on the key panel 112 is a mobile communication terminal position tracking selection key for receiving provided position information of the counterpart mobile communication terminal. The storage unit 113 stores a program necessary for the operation of the mobile communication terminal, and received and edited data. According to the present embodiment, stored in the storage unit 113 are respective individual position information and correlative position information of the mobile communication terminals. When parent terminal 100 receives positional information of child terminal 120, it is likewise stored in storage unit 113. The display unit 114 displays information regarding the operating state of the mobile communication terminal on an LCD. According to this embodiment, the display unit 114 displays the respective individual position information and correlative position information of the mobile communication terminals, an SMS message including the individual position information, and an SMS message including the correlative position information. The transmitter/receiver unit 115 transmits and receives data to/from the mobile communication server 160 and other mobile communication terminals connected to the mobile communication network 140 over the network 140. The individual position calculator 116 calculates the individual position information of the mobile communication terminal on the basis of AASA information provided from the mobile communication server 160. The correlative position calculator 117 calculates the correlative position information indicative of a positional correlation of the counterpart mobile communication terminal with respect to the mobile communication terminal based on the respective individual position information of the mobile communication terminals.

Preferably, the individual position calculator 116 and correlative position calculator 117 are adapted to calculate the individual position information and correlative position information at intervals of predetermined times, respectively. As a result, the display unit 114 updates the existing individual position information and correlative position information with the newly calculated ones and displays the updated information on the LCD. It is also preferred that the display unit 114 displays the calculated individual position information and correlative position information on the LCD in such a manner that they are marked on a map. Further, preferably, the display unit 114 marks moving paths of the parent terminal 100 and child terminal 120 on the map on the basis of the calculated individual position information and correlative position information.

Figure 3B:
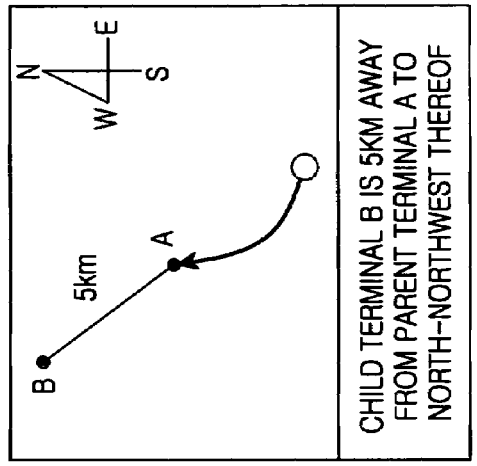
FIGS. 3a to 3c are views showing examples of individual position information and correlative position information displayed on an LCD.
Figure 3C:
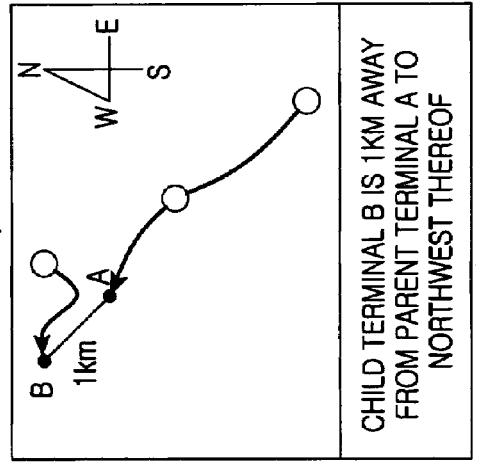
Figure 3A:
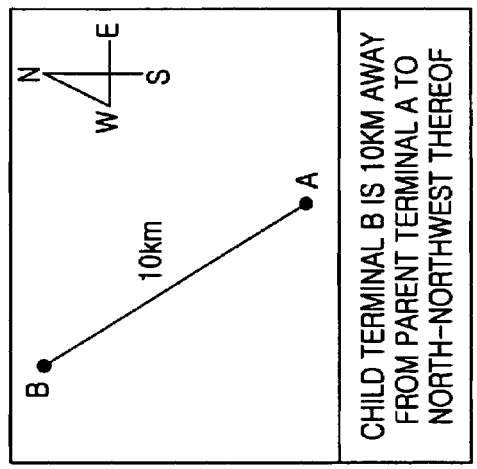

FIGS. 3a to 3c show examples of the individual position information and correlative position information displayed on the LCD. In these drawings, the parent terminal 100 is indicated by "A" and the child terminal 120 is indicated by "B".

FIG. 3a shows an example of the initially calculated individual position information and correlative position information displayed on the LCD. As shown in this drawing, the respective individual position information of the parent terminal A and child terminal B are marked on a map. These markings show that the distance between the parent terminal A and the child terminal B is 10 Km. Also displayed on the LCD screen is the correlative position information "The child terminal B is 10 Km away from the parent terminal A to the north-northwest thereof."

Each time the individual position information and correlative position information are calculated, moving paths of the parent terminal A and child terminal B are displayed on the LCD screen as shown in FIG. 3b. It can be seen from FIG. 3b that the parent moves with the parent terminal A toward the child terminal B. At this time, the child terminal B remains stopped, and does not move. As a result, the moving path of the parent terminal A and the distance between the parent terminal A and the child terminal B are displayed on the LCD screen. Also, information "The child terminal B is 5 Km away from the parent terminal A to the north-northwest thereof." is displayed as the correlative position information on the LCD screen.

On the other hand, if the child terminal B moves while the parent terminal A moves, the individual position information and correlative position information are displayed on the LCD screen as shown in FIG. 3c. As a result, the moving paths of the parent terminal A and child terminal B and the distance between the parent terminal A and the child terminal B are displayed on the LCD screen. Also, information "The child terminal B is 1 Km away from the parent terminal A to the northwest thereof." is displayed as the correlative position information on the LCD screen.

Therefore, the user holding the parent terminal A can more easily find out the position of the child terminal B by displaying direction information and distance information of the child terminal B relative to his/her position, marking them on the map and displaying moving paths of the respective terminals.

Figure 4:
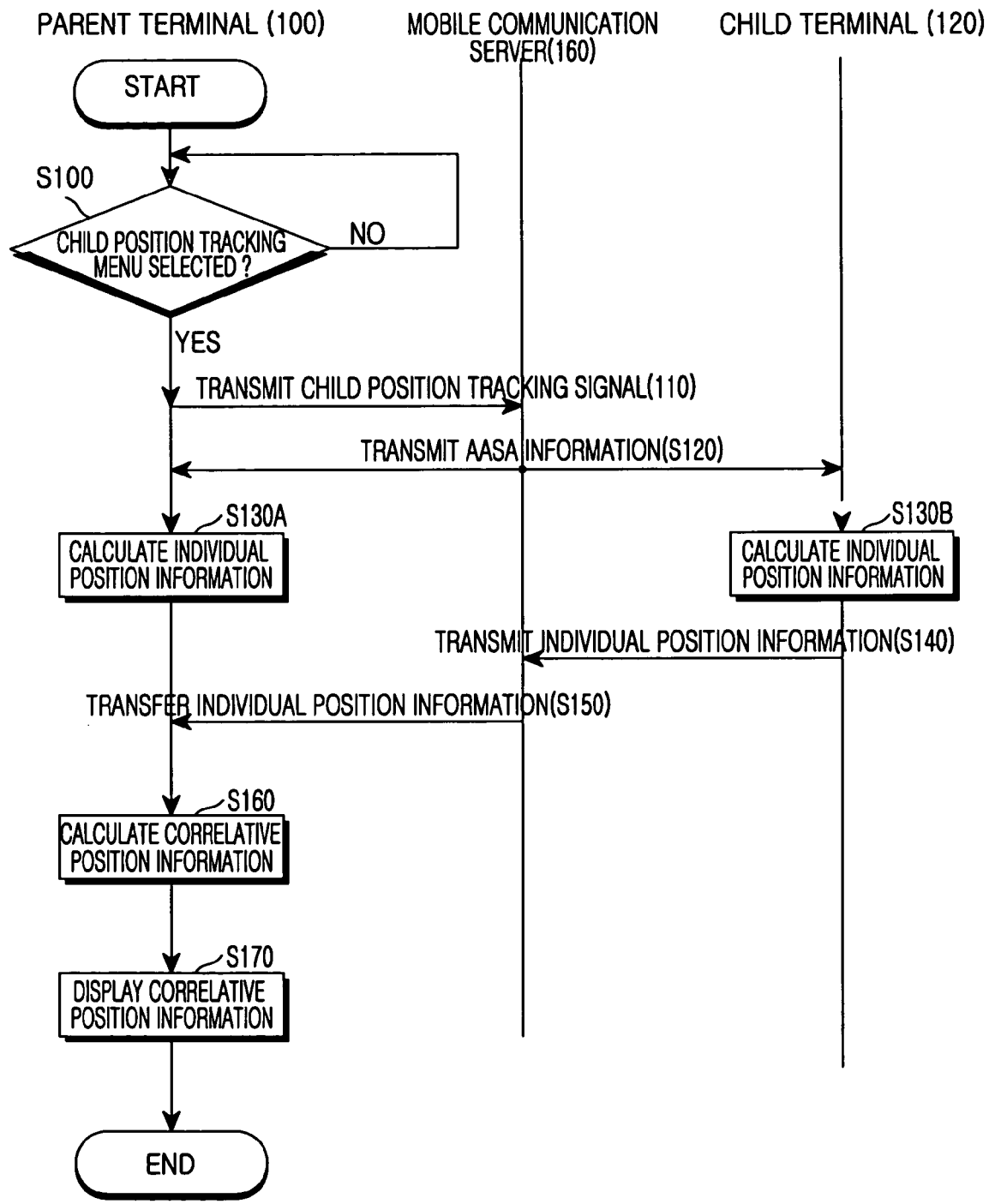
FIG. 4 is a flow chart illustrating a first embodiment of a method for providing position information of a mobile communication terminal using the terminal position information provision system in accordance with the present invention.

FIG. 4 is a flow chart illustrating a first embodiment of a method for providing position information of a mobile communication terminal using the terminal position information provision system in accordance with the present invention.

First, the parent terminal 100 determines whether a child position tracking menu has been selected through the key panel 112 (S100). Upon determining that the child position tracking menu has been selected, the parent terminal 100 transmits the child position tracking signal to the mobile communication server 160 over the mobile communication network 140 (S110). If the mobile communication server 160 receives the child position tracking signal transmitted from the parent terminal 100, then it transmits AASA information generated using radio waves from the GPS satellite 180 to the parent terminal 100 and child terminal 120 (S120).

The parent terminal 100 calculates its individual position information on the basis of the AASA information transmitted from the mobile communication server 160 (S130a). Also, the child terminal 120 calculates its individual position information on the basis of the AASA information transmitted from the mobile communication server 160 (S130b). The child terminal 120 then transmits the calculated individual position information thereof to the mobile communication server 160 (S140). The server 160 transfers the individual position information of the child terminal 120 to the parent terminal 100 (S150). The parent terminal 100 calculates correlative position information indicative of a positional correlation between it and the child terminal 120 on the basis of the individual position information thereof and the individual position information of the child terminal 120 (S160). The parent terminal 100 then displays the calculated correlative position information on the LCD (S170).

Accordingly, the position of the child terminal 120 to be found out can be more accurately acquired by calculating the position information of the terminal 120 using the GPS satellite 180.

Figure 5:
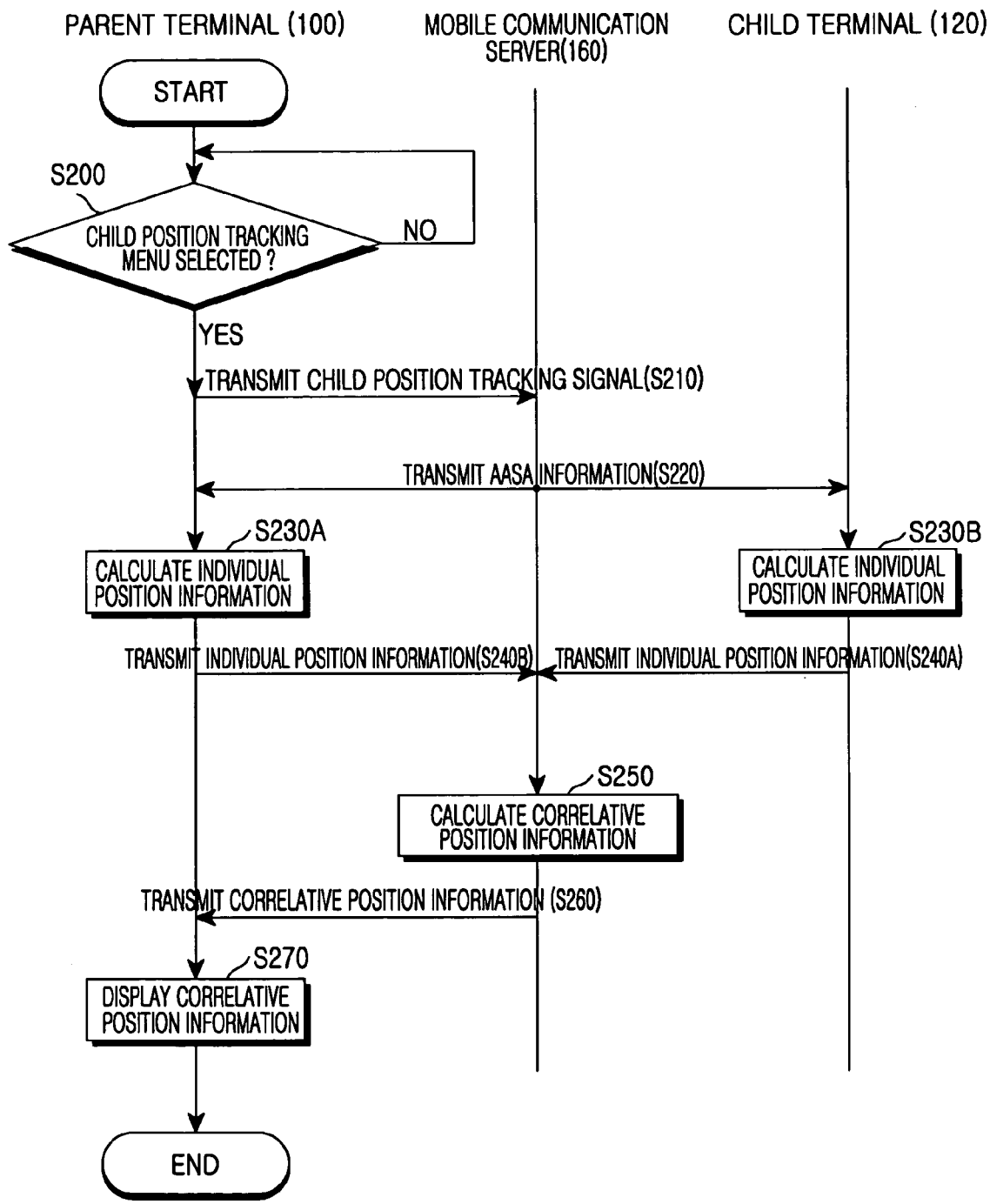
FIG. 5 is a flow chart illustrating a second embodiment of the terminal position information provision method using the terminal position information provision system in accordance with the present invention.

FIG. 5 is a flow chart illustrating a second embodiment of the terminal position information provision method using the terminal position information provision system in accordance with the present invention.

First, the parent terminal 100 determines whether the child position tracking menu has been selected through the key panel 112 (S200). If the child position tracking menu is determined to have been selected, then the parent terminal 100 transmits the child position tracking signal to the mobile communication server 160 over the mobile communication network 140 (S210). If the mobile communication server 160 receives the child position tracking signal transmitted from the parent terminal 100, then it transmits AASA information generated using radio waves from the GPS satellite 180 to the parent terminal 100 and child terminal 120 (S220).

The parent terminal 100 calculates its individual position information on the basis of the AASA information transmitted from the mobile communication server 160 (S230a). Also, the child terminal 120 calculates its individual position information on the basis of the AASA information transmitted from the mobile communication server 160 (S230b). Then, the child terminal 120 transmits the calculated individual position information thereof to the mobile communication server 160 (S240a) and the parent terminal 100 transmits the calculated individual position information thereof to the server 160 (S240b).

The mobile communication server 160 calculates correlative position information between the parent terminal 100 and the child terminal 120 based on the position of the parent terminal 100 on the basis of the respective individual position information of the terminals 100 and 120 (S250). The server 160 then transmits the calculated correlative position information to the parent terminal 100 (S260). The parent terminal 100 displays the correlative position information transmitted from the mobile communication server 160 on the LCD (S270).

Therefore, the position of the child terminal 120 to be found out can be more accurately acquired by calculating the position information of the terminal 120 using the GPS satellite 180.

Figure 6:
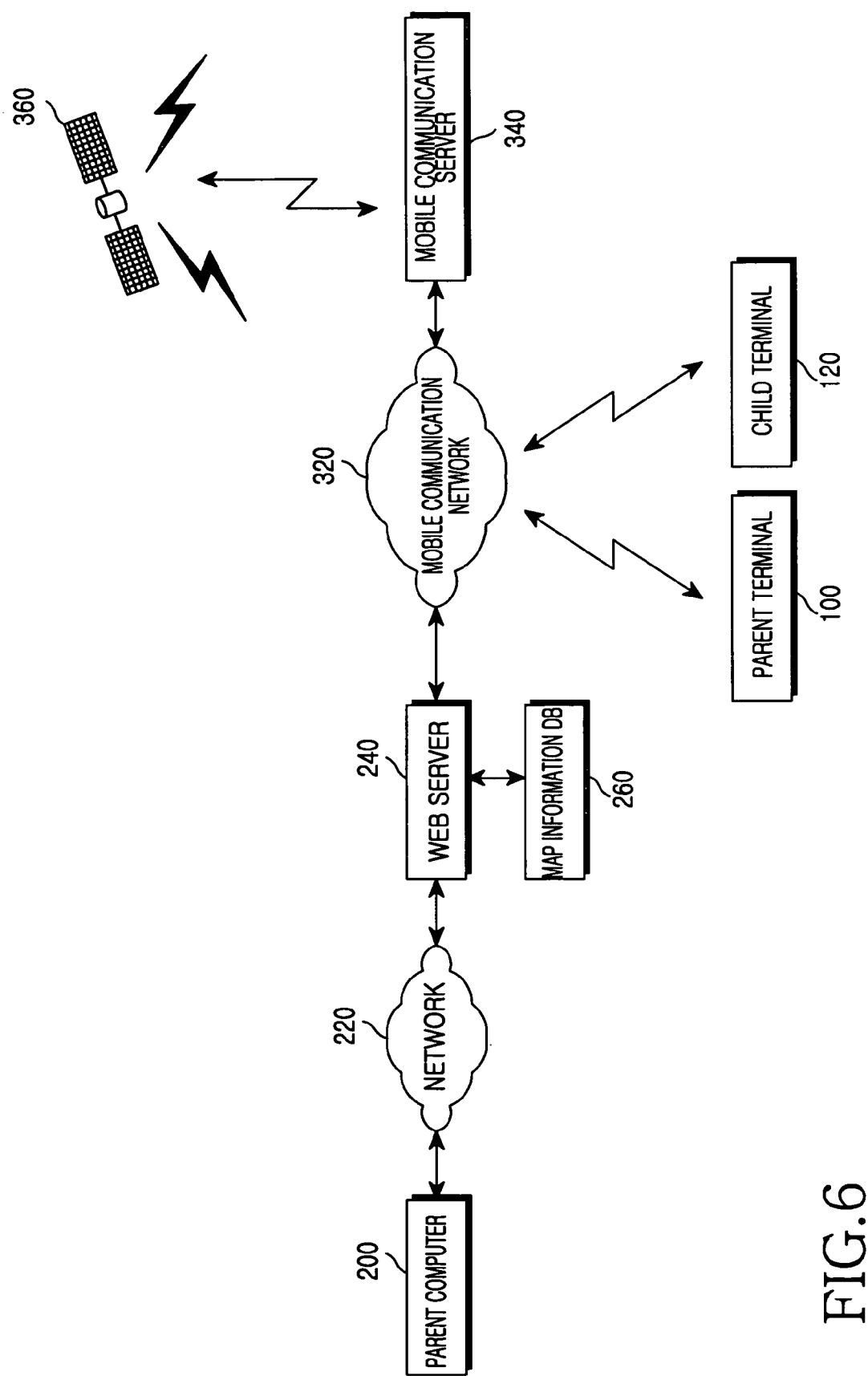
FIG. 6 is a block diagram showing a second embodiment of the terminal position information provision system in accordance with the present invention.

FIG. 6 is a block diagram showing a second embodiment of the terminal position information provision system in accordance with the present invention. This terminal position information provision system is implemented to request and provide position information of a mobile communication terminal on the Web. As shown in FIG. 6, the terminal position information provision system comprises a parent computer 200, a network 220, a Web server 240, a map information DB 260, a parent terminal 100, a child terminal 120, a mobile communication network 320, a mobile communication server 340 and a GPS satellite 360.

The parent computer 200 is a general personal computer, which is used by a parent of a child holding the child terminal 120 to request and receive a position information service associated with the child terminal 120. The network 220 connects the parent computer 200 and the Web server 240 with each other to enable communications there between. The Web server 240 communicates with the parent computer 200 and provides services associated with data transmitted there from. The map information DB 260 stores map information of each region. The parent terminal 100 is a wireless communication terminal held by the parent of the child holding the child terminal 120. The child terminal 120 is a mobile communication terminal held by the child of the parent holding the parent terminal 100. The mobile communication network 320 connects the Web server 240, the parent terminal 100, the child terminal 120 and the mobile communication server 340 with one another. The mobile communication server 340 communicates with the Web server 240, parent terminal 100 and child terminal 120 over the mobile communication network 320. The GPS satellite 360 generates and transmits radio waves for measurement of the position of each terminal 100, 120. At this time, the mobile communication server 340 generates AASA information on the basis of the radio waves transmitted from the GPS satellite 360.

In the present embodiment, the parent computer 200 transmits a child position tracking signal to the Web server 240 over the network 220 in response to an input signal to find out the position of the child terminal 120. The Web server 240 transfers the child position tracking signal transmitted from the parent computer 200 to the mobile communication server 340 over the mobile communication network 320. Upon receiving the child position tracking signal, the mobile communication server 340 transmits the AASA information generated on the basis of the radio waves from the GPS satellite 360 to the parent terminal 100 and child terminal 120 over the mobile communication network 320.

The parent terminal 100 and child terminal 200 calculate their respective individual position information on the basis of the AASA information and transmit the calculated respective individual position information to the mobile communication server 340 over the mobile communication network 320. The mobile communication server 340 transfers the received individual position information of the parent terminal 100 and child terminal 120 to the Web server 240 over the mobile communication network 320.

The Web server 240 calculates correlative position information between the parent terminal 100 and the child terminal 120 on the basis of the individual position information of the terminals 100 and 120 and marks the calculated correlative position information on an associated map stored in the map information DB 260. The Web server 240 then transmits the map marked with the correlative position information, or the map including the correlative position information, to the parent computer 200 over the network 220. The parent computer 200 displays the map including the correlative position information between the parent terminal 100 and the child terminal 120 through a monitor (not shown).

Accordingly, the position information of the child terminal 120 can be more accurately provided even on the Web by requesting it over the Web, calculating the correlative position information through the GPS satellite 360 and marking the calculated information on the map.

Figure 7:
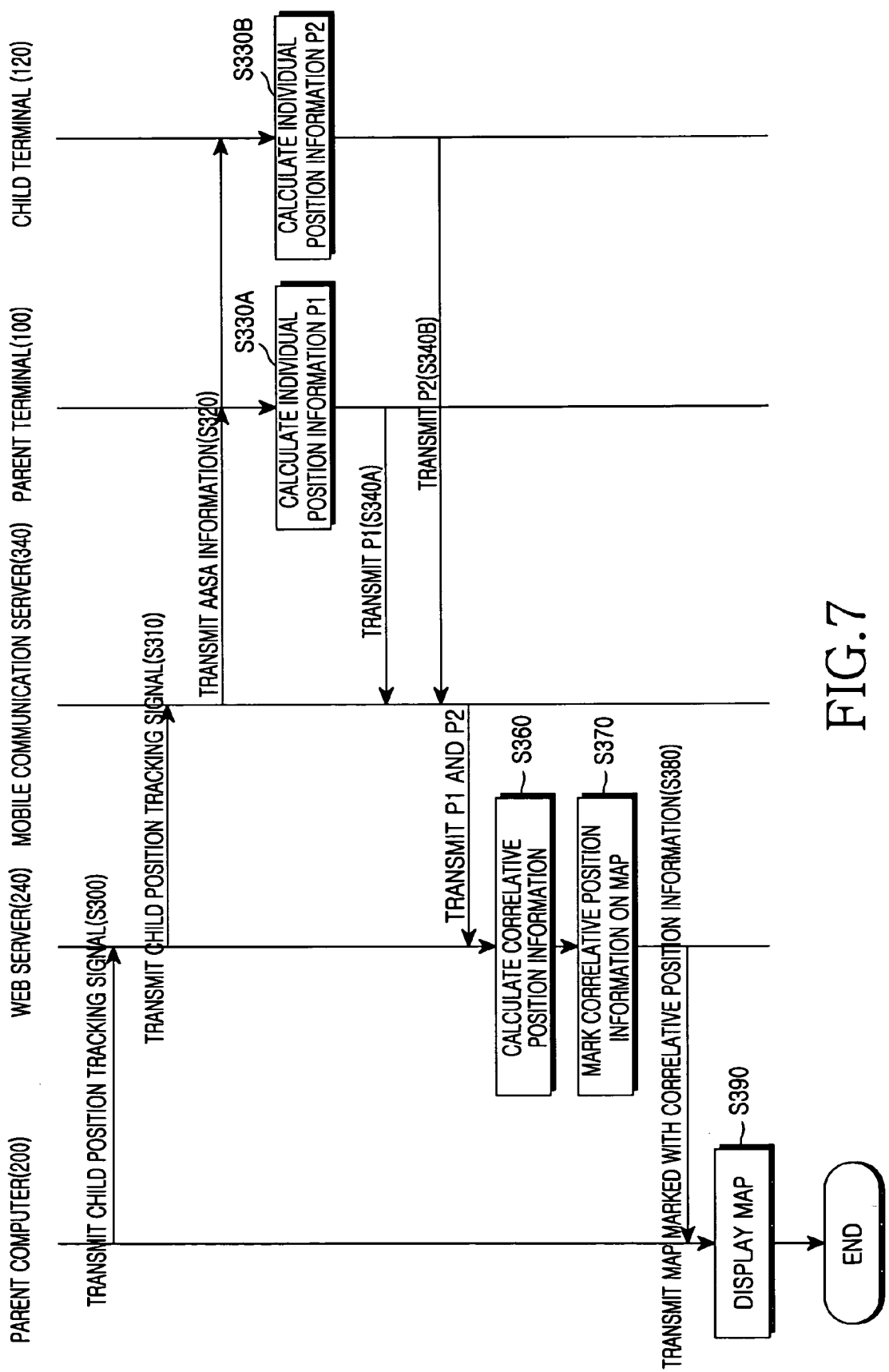
FIG. 7 is a flow chart illustrating a third embodiment of the terminal position information provision method using the terminal position information provision system in accordance with the present invention.

FIG. 7 is a flow chart illustrating a third embodiment of the terminal position information provision method using the terminal position information provision system in accordance with the present invention.

First, upon receiving an input signal for finding out the position of the child terminal 120, the parent computer 200 transmits the child position tracking signal to the Web server 240 (S300). The Web server 240 transfers the child position tracking signal transmitted from the parent computer 200 to the mobile communication server 340 (S310). If the mobile communication server 340 receives the child position tracking signal, then it transmits the AASA information generated on the basis of the radio waves from the GPS satellite 360 to the parent terminal 100 and child terminal 120 (S320).

The parent terminal 100 calculates its individual position information P1 on the basis of the AASA information transmitted from the mobile communication server 340 (S330a) and the child terminal 120 calculates its individual position information P2 on the basis of the AASA information transmitted from the server 340 (S330b). Then, the parent terminal 100 transmits the calculated individual position information P1 thereof to the mobile communication server 340 (S340a) and the child terminal 120 transmits the calculated individual position information P2 thereof to the server 340 (S340b).

The mobile communication server 340 receives the individual position information P1 and P2 transmitted respectively from the parent terminal 100 and child terminal 120 and transfers the received information P1 and P2 to the Web server 240 (S350). The Web server 240 calculates correlative position information between the parent terminal 100 and the child terminal 120 on the basis of the individual position information P1 and P2 of the terminals 100 and 120 (S360). The Web server 240 then marks the calculated correlative position information on an associated map stored in the map information DB 260 (S370). The Web server 240 then transmits the map marked with the correlative position information, or the map including the correlative position information, to the parent computer 200 over the network 220 (S380). If the parent computer 200 receives the map including the correlative position information between the parent terminal 100 and the child terminal 120, then it displays the received map on the LCD screen (S390).

Therefore, the position of a mobile communication terminal can be more accurately acquired over the Web by requesting position information of the mobile communication terminal on the Web, calculating inter-terminal correlative position information using the GPS satellite 360 and marking the calculated information on the map.

Figure 8:
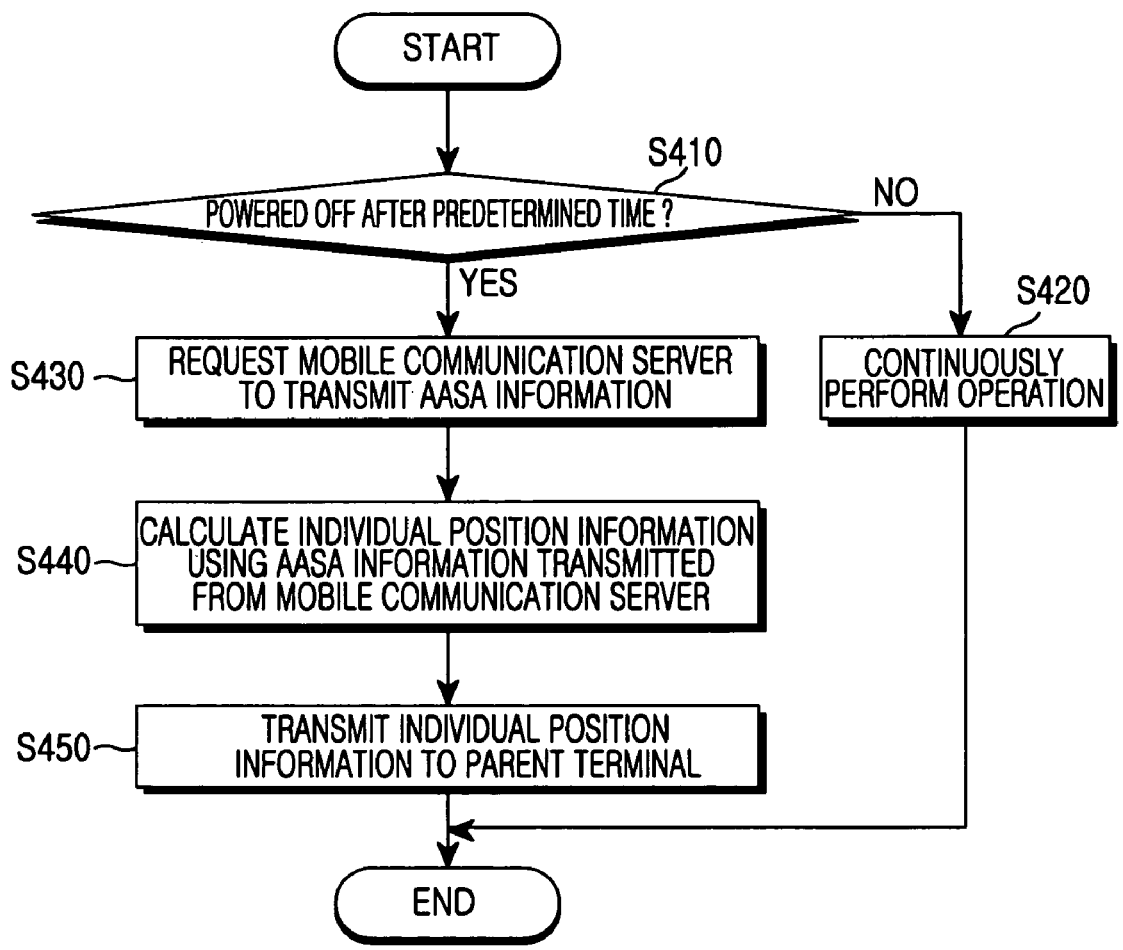
FIG. 8 is a flow chart illustrating a fourth embodiment of the terminal position information provision method using the terminal position information provision system in accordance with the present invention.

FIG. 8 is a flow chart illustrating a fourth embodiment of the terminal position information provision method using the terminal position information provision system in accordance with the present invention. For reference, this embodiment is associated with the child terminal 120 in FIG. 1. First, the child terminal 120 determines whether it will be powered off after the lapse of a predetermined period of time (S410). If the child terminal 120 determines that it will not be powered off after the lapse of the predetermined time period, then it continuously performs its normal operations (S420).

If the child terminal 120 determines at step S410 that it will be powered off after the lapse of the predetermined time period, then before power off it requests the mobile communication server 160 to transmit AASA information for position information calculation (S430). Thereafter, the child terminal 120 calculates its individual position information on the basis of the AASA information transmitted from the mobile communication server 160 (S440). The child terminal 120 then transmits the calculated individual position information thereof to the parent terminal 100 (S450). At this time, the child terminal 120 preferably converts the calculated individual position information thereof into an SMS message and transmits the converted SMS message to the parent terminal 100.

As a result, the child terminal 120 transmits its position information to the parent terminal 100 just before it is powered off, thereby making it easier to track the position of the child terminal 120.

As apparent from the above description, according to the present invention, position information of a mobile communication terminal can be more accurately provided by calculating it using radio waves transmitted from a GPS satellite.

Further, inter-terminal correlative position information can be calculated and provided on the basis of individual position information of respective mobile communication terminals acquired using a GPS satellite. Therefore, the position of a target mobile communication terminal can be more easily acquired.

Moreover, if a target mobile communication terminal enters a power-off mode, then it can calculate its position information using a GPS satellite and transmit the calculated position information to another mobile communication terminal linked thereto in the form of an SMS message, before being powered off. Therefore, even though the target mobile communication terminal is powered off, its position can be more easily estimated.

Furthermore, the position of a mobile communication terminal can be more accurately acquired over the Web by requesting position information of the mobile communication terminal on the Web, calculating inter-terminal correlative position information using a GPS satellite and marking the calculated information on a map.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for providing position information of a target mobile communication terminal whose position is to be found out, comprising:

a first mobile communication terminal for transmitting a position tracking signal for determining the position of said target mobile communication terminal, and calculating and transmitting first individual position information on the basis of acquisition assistance sensitive assistance (AASA) information at intervals of a predetermined time, said AASA information including a received signal strength indicator of radio waves transmitted from a GPS (Global Positioning System) satellite;

a second mobile communication terminal being said target mobile communication terminal, said second mobile communication terminal calculating and transmitting second individual position information on the basis of said AASA information at intervals of a predetermined time; and a mobile communication server for generating said AASA information using said radio waves, transmitting the generated AASA information to said first mobile communication terminal and second mobile communication terminal upon receiving said position tracking signal transmitted from said first mobile communication terminal, and transferring said second individual position information transmitted from said second mobile communication terminal to said first mobile communication terminal, wherein said first mobile communication terminal is adapted to calculate correlative position information between it and said second mobile communication terminal on the basis of said first individual position information and second individual position information at intervals of a predetermined time and output the calculated correlative position information to a screen.

2. The system as set forth in claim 1, wherein said first mobile communication terminal is adapted to mark said first individual position information, second individual position information and correlative position information on a map, output the resulting map to said screen and, whenever any of said first individual position information, second individual position information and correlative position information are changed, update the existing information marked on said map with the changed information and mark the updated information on said map.

3. The system as set forth in claim 2, wherein said first mobile communication terminal is adapted to, whenever said first individual position information and second individual information are calculated, update moving paths of said first mobile communication terminal and second mobile communication terminal on the basis of the calculated first individual position information and second individual information and mark the updated moving paths on said map.

4. The system as set forth in claim 3, wherein each of said first and second individual position information includes at least one of latitude information, longitude information and altitude information of a corresponding one of said first and second mobile communication terminals.

5. The system as set forth in claim 4, wherein said correlative position information includes at least one of information regarding a direction and distance from said first mobile communication terminal to said second mobile communication terminal.

6. A method for providing position information of a target mobile communication terminal whose position is to be determined, using a communication system, said communication system including a mobile communication server, a mobile communication network and first and second mobile communication terminals connected to said mobile communication server over said mobile communication network, said second mobile communication terminal being said target mobile communication terminal, said method comprising the steps of:

a) transmitting a position tracking signal for determining the position of said second mobile communication terminal to said mobile communication server, said server generating AASA information for position information calculation on the basis of radio waves transmitted from a GPS satellite;

b) calculating first individual position information of said first mobile communication terminal on the basis of said AASA information transmitted from said mobile communication server in response to said position tracking signal received thereby;

c) calculating second individual position information of said second mobile communication terminal on the basis of said AASA information transmitted from said mobile communication server in response to said position tracking signal received thereby, transferring the calculated second individual position information to said first mobile communication terminal through said mobile communication server and determining whether said second individual position information has been received by said first mobile communication terminal;

d) calculating correlative position information between said first mobile communication terminal and said second mobile communication terminal on the basis of said first individual position information and second individual position information if said second individual position information is determined to have been received; and e) outputting the calculated correlative position information to a screen.

7. The method as set forth in claim 6, wherein said correlative position information includes said first individual position information and said second individual position information; and wherein said step e) includes the step e-1) of outputting said correlative position information including said first individual position information and said second individual position information to said screen.

8. The method as set forth in claim 7, wherein said step e) further includes the step e-2) of marking said correlative position information on a map and outputting said map marked with said correlative position information to said screen.

9. The method as set forth in claim 8, wherein each of said first and second individual position information includes at least one of latitude information, longitude information and altitude information of a corresponding one of said first and second mobile communication terminals.

10. The method as set forth in claim 9, wherein said correlative position information includes at least one of information regarding a direction and distance from said first mobile communication terminal to said second mobile communication terminal.

11. A system for providing position information of a target mobile communication terminal whose position is to be determined, comprising:

a first mobile communication terminal for transmitting a position tracking signal for determining the position of said target mobile communication terminal, and calculating and transmitting first individual position information on the basis of AASA information at intervals of a predetermined time, said AASA information including a received signal strength indicator of radio waves transmitted from a GPS satellite;

a second mobile communication terminal being said target mobile communication terminal, said second mobile communication terminal calculating and transmitting second individual position information on the basis of said AASA information at intervals of a predetermined time; and a mobile communication server for generating said AASA information using said radio waves, transmitting the generated AASA information to said first mobile communication terminal and second mobile communication terminal upon receiving said position tracking signal, calculating correlative position information between said first mobile communication terminal and said second mobile communication terminal on the basis of said first individual position information and second individual position information whenever said first and second individual position information are received and transmitting the calculated correlative position information to said first mobile communication terminal, wherein said first mobile communication terminal is adapted to update said correlative position information whenever said correlative position information is received and output the updated correlative position information to a screen.

12. The system as set forth in claim 11, wherein said mobile communication server is adapted to mark said first individual position information, second individual position information and correlative position information on a map, transmit the resulting map to said first mobile communication terminal and, whenever any of said first individual position information, second individual position information and correlative position information are changed, update the existing information marked on said map with the changed information, mark the updated information on said map and transmit the resulting map to said first mobile communication terminal.

13. The system as set forth in claim 12, wherein said mobile communication server is adapted to, whenever said first individual position information and second individual information are received, update moving paths of said first mobile communication terminal and second mobile communication terminal on the basis of the received first individual position information and second individual information, mark the updated moving paths on said map and transmit said map marked with the updated moving paths to said first mobile communication terminal.

14. The system as set forth in claim 13, wherein each of said first and second individual position information includes at least one of latitude information, longitude information and altitude information of a corresponding one of said first and second mobile communication terminals.

15. The system as set forth in claim 14, wherein said correlative position information includes at least one of information regarding a direction and distance from said first mobile communication terminal to said second mobile communication terminal.

16. A method for providing position information of a target mobile communication terminal whose position is to be determined, using a communication system, said communication system including a mobile communication server, a mobile communication network and first and second mobile communication terminals connected to said mobile communication server over said mobile communication network, said second mobile communication terminal being said target mobile communication terminal, said method comprising the steps of:

a) transmitting a position tracking signal for determining the position of said second mobile communication terminal to said mobile communication server, said server generating AASA information for position information calculation on the basis of radio waves transmitted from a GPS satellite;

b) calculating first individual position information of said first mobile communication terminal by said first mobile communication terminal and second individual position information of said second mobile communication terminal by said second mobile communication terminal on the basis of said AASA information transmitted to said first mobile communication terminal and second mobile communication terminal by said mobile communication server in response to said position tracking signal received thereby and transmitting the calculated first and second individual position information to said mobile communication server;

c) calculating and transmitting correlative position information between said first mobile communication terminal and said second mobile communication terminal on the basis of said first individual position information and second individual position information by said mobile communication server and receiving the transmitted correlative position information by said first mobile communication terminal; and d) outputting the received correlative position information to a screen.

17. The method as set forth in claim 16, wherein said step d) includes the step d-1) of marking said correlative position information on a map along with said first individual position information and second individual position information and outputting the resulting map to said screen.

18. The method as set forth in claim 17, wherein said step d) further includes the step d-2) of updating said correlative position information outputted to said screen whenever it is received, outputting the updated correlative position information to said screen, marking moving paths of said first mobile communication terminal and second mobile communication terminal on said map on the basis of said first individual position information and second individual position information and outputting the resulting map to said screen.

19. The method as set forth in claim 18, wherein each of said first and second individual position information includes at least one of latitude information, longitude information and altitude information of a corresponding one of said first and second mobile communication terminals.

20. The method as set forth in claim 19, wherein said correlative position information includes at least one of information regarding a direction and distance from said first mobile communication terminal to said second mobile communication terminal.

21. A system for providing position information of a target mobile communication terminal whose position is to be determined, comprising:

a communication terminal for transmitting a position tracking signal for determining the position of said target mobile communication terminal;

a first mobile communication terminal for calculating and transmitting first individual position information on the basis of AASA information at intervals of a predetermined time, said AASA information including a received signal strength indicator of radio waves transmitted from a GPS satellite;

a second mobile communication terminal being said target mobile communication terminal, said second mobile communication terminal calculating and transmitting second individual position information on the basis of said AASA information at intervals of a predetermined time;

a mobile communication server responsive to said position tracking signal for generating said AASA information using said radio waves and transmitting the generated AASA information to said first mobile communication terminal and second mobile communication terminal, said mobile communication server receiving and transferring said first individual position information and second individual position information transmitted respectively from said first mobile communication terminal and second mobile communication terminal; and a Web server connected with said communication terminal over a network and with said mobile communication server over a mobile communication network, said Web server calculating correlative position information between said first mobile communication terminal and said second mobile communication terminal on the basis of said first individual position information and second individual position information at intervals of a predetermined time and transmitting the calculated correlative position information to said communication terminal, wherein said communication terminal is adapted to receive the transmitted correlative position information and output it to a screen.

22. The system as set forth in claim 21, wherein said Web server is adapted to mark said correlative position information including said first individual position information and second individual position information on a map and provide the resulting map to said communication terminal; and wherein said communication terminal is adapted to receive said map and output it to said screen.

23. The system as set forth in claim 22, wherein each of said first and second individual position information includes at least one of latitude information, longitude information and altitude information of a corresponding one of said first and second mobile communication terminals.

24. The system as set forth in claim 23, wherein said correlative position information includes at least one of information regarding a direction and distance from said first mobile communication terminal to said second mobile communication terminal.

25. A method for providing position information of a target mobile communication terminal whose position is to be determined, using a communication system, said communication system including a communication terminal, a Web server connected with said communication terminal over a network, a mobile communication server connected with said Web server over a mobile communication network, said mobile communication server generating AASA information for position information calculation using radio waves transmitted from a GPS satellite, and first and second mobile communication terminals connected to said mobile communication network, said second mobile communication terminal being said target mobile communication terminal, said method comprising the steps of:

a) transmitting a position tracking signal for determining the position of said second mobile communication terminal to said mobile communication server via said Web server;

b) determining whether calculated correlative position information has been received, where calculated correlative position information is determined by calculating first individual position information of said first mobile communication terminal and second individual position information of said second mobile communication terminal on the basis of said AASA information transmitted to said first mobile communication terminal and second mobile communication terminal by said mobile communication server in response to said position tracking signal received thereby, and calculating correlative position information between said first mobile communication terminal and said second mobile communication terminal on the basis of the calculated first individual position information and second individual position information by said Web server; and c) if said correlative position information is determined to have been received, updating the received correlative position information at intervals of a predetermined time and outputting the updated correlative position information to a screen.

26. The method as set forth in claim 25, wherein said step c) includes the step of marking moving paths of said first mobile communication terminal and second mobile communication terminal on a map on the basis of said first individual position information and second individual position information and outputting the resulting map to said screen.

27. The method as set forth in claim 26, wherein each of said first and second individual position information includes at least one of latitude information, longitude information and altitude information of a corresponding one of said first and second mobile communication terminals.

28. The method as set forth in claim 27, wherein said correlative position information includes at least one of information regarding a direction and distance from said first mobile communication terminal to said second mobile communication terminal.

29. The system as set forth in claim 1, wherein if it is determined that said second mobile communication terminal is powered off after lapse of a predetermined period of time in a power-on state, said second mobile communication terminal requests said mobile communication server to transmit said AASA information for position information calculation, calculates said second individual position information on the basis of the AASA information received from said mobile communication server and transmits the calculated individual position information to the mobile communication server.

30. The system as set forth in claim 1, wherein after calculating said second individual position information, said second mobile communication terminal generates a short message service (SMS) message including said second individual position information and transmits said SMS message to said mobile communication server.

31. The method as set forth in claim 16, wherein said step b) of calculating said second individual position information and transmitting said calculated information to said mobile communication server includes the steps of b-1) determining whether said second mobile communication terminal is powered off after lapse of a predetermined period of time in a power-on state; b-2) if it is determined that said second mobile communication terminal is powered off, requesting said mobile communication server to transmit said AASA information and receiving said AASA information; b-3) calculating said second individual position information on the basis of the received AASA information; and b-4) transmitting said calculated individual position information to said mobile communication server.

32. The method as set forth in claim 16, wherein said step b) of transmitting said calculated individual location information to said mobile communication server further includes the steps of b-5) generating a short message service (SMS) message including said individual position information; and b-6) transmitting said SMS message to said mobile communication server.

* * * * *